US009293083B2

(12) United States Patent
Chen

(10) Patent No.: US 9,293,083 B2
(45) Date of Patent: Mar. 22, 2016

(54) PIXEL CIRCUIT AND DISPLAY

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventor: Junsheng Chen, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/367,078

(22) PCT Filed: Dec. 10, 2013

(86) PCT No.: PCT/CN2013/089015

§ 371 (c)(1),
(2) Date: Jun. 19, 2014

(87) PCT Pub. No.: WO2015/032140

PCT Pub. Date: Mar. 12, 2015

(65) Prior Publication Data

US 2015/0070252 A1 Mar. 12, 2015

(30) Foreign Application Priority Data

Sep. 6, 2013 (CN) .......................... 2013 1 0404386

(51) Int. Cl.
*G09G 3/30* (2006.01)
*G09G 5/02* (2006.01)
(Continued)

(52) U.S. Cl.
CPC ...... *G09G 3/3233* (2013.01); *G09G 2300/0852* (2013.01); *G09G 2300/0861* (2013.01); *G09G 2310/06* (2013.01)

(58) Field of Classification Search
CPC .................... G09G 3/3233; G09G 2300/0804; G09G 2300/0443
See application file for complete search history.

(56) References Cited

U.S. PATENT DOCUMENTS

2006/0038757 A1* 2/2006 Lee ...................... G09G 3/3233 345/77
2007/0195019 A1* 8/2007 Ono ..................... G09G 3/3233 345/76

(Continued)

FOREIGN PATENT DOCUMENTS

CN 203480810 U 3/2014

OTHER PUBLICATIONS

International Search Report dated Mar. 28, 2014; PCT/CN2013/089015.

(Continued)

*Primary Examiner* — Quan-Zhen Wang
*Assistant Examiner* — Lin Li
(74) *Attorney, Agent, or Firm* — Ladas & Parry LLP

(57) ABSTRACT

A pixel circuit and a display, wherein the pixel circuit includes: a first pixel sub-circuit and a second pixel sub-circuit, as well as an initialization module and a data voltage writing module connected to the first pixel sub-circuit and the second pixel sub-circuit; wherein the initialization module is connected to a reset signal terminal and a low potential terminal, and is used to initialize the first pixel sub-circuit and the second pixel sub-circuit under a control of a reset signal inputted from the reset signal terminal; the data voltage writing module is connected to a data signal line and a gate signal terminal, and is used to firstly write a first data voltage to the first pixel sub-circuit and the second pixel sub-circuit under a control of a signal inputted from the gate signal terminal and to compensate for a driving module of the second pixel sub-circuit, and then to write a second data voltage to the first pixel sub-circuit and compensate for a driving module of the first pixel sub-circuit. The pixel circuit and the display can reduce a size of pixel circuit, so as to further reduce a pixel pitch, increase the number of the pixels contained in per unit area and improve a picture display quality.

20 Claims, 9 Drawing Sheets

(51) Int. Cl.
*G02F 1/1343* (2006.01)
*G09G 3/32* (2006.01)

(56) References Cited

U.S. PATENT DOCUMENTS

2008/0048946 A1* 2/2008 Kwak .................... G09G 3/006
345/76
2008/0284931 A1* 11/2008 Kimura ............... G02F 1/13624
349/39
2011/0121738 A1 5/2011 Kawano et al.
2012/0139978 A1* 6/2012 Ikeda .................. G09G 3/3233
345/694

OTHER PUBLICATIONS

Written Opinion of the International Searching Authority dated Apr. 30, 2014; PCT/CN2013/089015.

* cited by examiner

PIXEL CIRCUIT AND DISPLAY

TECHNICAL FIELD

The present disclosure relates to a field of display technology, and more particularly, to a pixel circuit and a display.

BACKGROUND

A backboard of an existing high-end active matrix organic light emitting diode (AMOLED) product with medium or small size mostly employs a process technology of low temperature poly-silicon (LTPS); however, since fluctuation of LTPS process will lead to drift of the threshold voltage of a thin film transistor (TFT) device, rendering current for driving organic light emitting diode (OLED) device unstable and resulting in a decrease in the display quality of pictures. Pixel compensation circuit as known is a circuit of 6T1C type (a circuit formed by six thin film transistors and one capacitor), and the circuit diagram is shown in FIG. 1, where VDD is a high voltage level signal, VSS is a low voltage level signal, Data is a data signal, Gate is a gate control signal, Reset is an initialization control signal, Vinit is an initialization voltage level signal, Emission (that is, EM) is a signal for controlling light emission of OLED and is provided by the light emission circuit of the OLED panel. However, it is not easy to dispose six thin film transistors and one capacitor in one pixel, and since it needs the TFT devices to be made very small, and thus requirements for performance of the TFT devices are also relatively high, which may cause a pixel pitch to be unable to be further decreased.

As shown in FIG. 2, for the 6T1C circuit as known, devices which needs to be disposed on a horizon direction of two pixels includes two data signal lines (Data v1 and Data v2), twelve TFTs, two capacitors, one gate control signal line Gate, one light emission control signal terminal Emission, one high voltage level signal terminal VDD, one initialization voltage level signal terminal Vinit, and one initialization control signal terminal Reset; in FIG. 2, there are two organic light-emitting diodes, OLED 1 and OLED 2, and each of the cathodes thereof is connected to a low voltage level signal VSS. FIG. 2 is a circuit schematic diagram of two pixels arranged in horizon, and a pixel unit formed in the vertical direction is similar to the pixel unit formed in the horizontal direction, that is, the devices that needs to be disposed in the vertical direction includes one data signal line, twelve TFTs, two capacitors, two gate control signal lines, one light emission control signal terminal Emission, one high voltage level signal terminal VDD and one initialization voltage level signal terminal Vinit.

As described above, as known, there needs to dispose 12 TFTs and two capacitors in two pixels.

SUMMARY

Embodiments of the present disclosure provide a pixel circuit for reducing a size of pixel circuit, so as to further reduce a pixel pitch, increase the number of the pixels contained in per unit area and improve picture display quality. An embodiment of the present disclosure further provides a display.

A pixel circuit provided in accordance with an embodiment of the present disclosure comprises a first pixel sub-circuit and a second pixel sub-circuit, as well as an initialization module and a data voltage writing module connected to the first pixel sub-circuit and the second pixel sub-circuit, wherein the initialization module is connected to a reset signal terminal and a low potential terminal, and is configured to initialize the first pixel sub-circuit and the second pixel sub-circuit under a control of a reset signal inputted from the reset signal terminal;

the data voltage writing module is connected to a data signal line and a gate signal terminal, and is configured to firstly write a first data voltage to the first pixel sub-circuit and the second pixel sub-circuit under a control of a signal inputted from the gate signal terminal and to compensate for a driving module of the second pixel sub-circuit, and then to write a second data voltage to the first pixel sub-circuit and compensate for a driving module of the first pixel sub-circuit.

The pixel circuit provided in accordance with an embodiment of the present disclosure comprises the first pixel sub-circuit and the second pixel sub-circuit, as well as the initialization module and the data voltage writing module connected to the first pixel sub-circuit and the second pixel sub-circuit; the pixel circuit formed by the first pixel sub-circuit, the second pixel sub-circuit, the initialization module and the data voltage writing module can reduce the size of the pixel circuit, so as to further reduce the pixel pitch, increase the number of the pixels contained in per unit area and improve picture display quality.

Optionally, the first pixel sub-circuit comprises a first driving module, a first light emission module, a first threshold compensation module and a first light emission control module, wherein the initialization module is connected to the first threshold compensation module and is configured to initialize the first threshold compensation module under a control of an initialization signal outputted from the initialization module;

the first threshold compensation module is connected to the first driving module, and is configured to perform threshold voltage compensation on the first driving module;

the first light emission module is connected to the first light emission control module, and is configured to emit light for displaying on effects of the first light emission control module.

In this way, the first pixel sub-circuit formed by the first driving module, the first light emission module, the first threshold compensation module and the first light emission control module is easy to be implemented in design of the pixel circuit.

Optionally, the first threshold compensation module comprises a first storage capacitor and a fourth transistor; the first driving module comprises a fifth transistor; the first light emission control module comprises a seventh transistor and an eighth transistor; and the first light emission module comprises a first light-emitting diode.

In this way, the first pixel sub-circuit formed by the first storage capacitor, the respective transistors and the first light-emitting diode is easy to be implemented in design of the pixel circuit.

Optionally, one terminal of the first storage capacitor is connected to a high voltage level signal line, and the other terminal thereof is connected to the source of the fourth transistor;

a gate of the fourth transistor is connected to a gate signal terminal, and a drain of the fourth transistor is connected to the drain of the fifth transistor;

a gate of the fifth transistor is connected to the initialization module, and a source of the fifth transistor is connected to the data voltage writing module;

a gate of the seventh transistor is connected to the light emission control signal line, a source of the seventh transistor is connected to the high voltage level signal line, a drain of the seventh transistor is connected to the source of the fifth transistor;

a gate of the eighth transistor is connected to the light emission control signal line, a source of the eighth transistor is connected to the drain of the fifth transistor, and a drain of the eighth transistor is connected to the first light-emitting diode;

an anode of the first light-emitting diode is connected to the drain of the eighth transistor, and a cathode of the first light-emitting diode is connected to the low voltage level signal line.

In this way, the connection relationship of the storage capacitor, the transistors and the light-emitting diode is easy to be implemented in design of the pixel circuit.

Optionally, the second pixel sub-circuit comprises a second driving module, a second light emission module, a second threshold compensation module and a second light emission control module;

the initialization module is connected to the second threshold compensation module and is configured to initialize the second threshold compensation module by an initialization signal;

the second threshold compensation module is connected to the second driving module, and is configured to perform threshold voltage compensation on the second driving module; and the second light emission module is connected to the second light emission control module, and is configured to emit light for displaying on effects of the second light emission control module.

In this way, the second pixel sub-circuit formed by the second driving module, the second light emission module, the second threshold compensation module and the second light emission control module is easy to be implemented in design of the pixel circuit.

Optionally, the second threshold compensation module comprises a second storage capacitor and a second transistor; the second driving module comprises a sixth transistor; the second light emission control module comprises a seventh transistor and a ninth transistor; and the second light emission module comprises a second light-emitting diode.

In this way, the second pixel sub-circuit formed by the second storage capacitor, the respective transistors and the second light-emitting diode is easy to be implemented in design of the pixel circuit.

Optionally, one terminal of the second storage capacitor is connected to the high voltage level signal line, and the other terminal thereof is connected to a source of the second transistor;

a gate of the second transistor is connected to a switching control signal line, and a drain of the second transistor is connected to the initialization module;

a gate of the sixth transistor is connected to the source of the second transistor, and a source of the sixth transistor is connected to the data voltage writing module;

a gate of the seventh transistor is connected to the light emission control signal line, and a source of the seventh transistor is connected to the high voltage level signal line, and a drain of the seventh transistor is connected to the source of the sixth transistor;

a gate of the ninth transistor is connected to the light emission control signal line, a source of the ninth transistor is connected to a drain of the sixth transistor, a drain of the ninth transistor is connected to the second light-emitting diode;

an anode of the second light-emitting diode is connected to the drain of the ninth transistor, and the cathode of the second light-emitting diode is connected to the low voltage level signal line.

In this way, the connection relationship of the storage capacitor, the transistors and the light-emitting diode is easy to be implemented in design of the pixel circuit.

Optionally, the initialization module comprises a third transistor, wherein a gate of the third transistor is connected to a reset signal line, a drain of the third transistor is connected to the first threshold compensation module of the first pixel sub-circuit and the second threshold compensation module of the second pixel sub-circuit, and a source of the third transistor is connected to the low potential terminal.

In this way, the initialization module comprises the third transistor, and the third transistor functions as a switching device of the initialization module in the pixel circuit and is easy to be implemented in the circuit design.

Optionally, the data voltage writing module comprises a first transistor, wherein the gate of the first transistor is connected to the gate signal terminal, the source of the first transistor is connected to a data signal line, and the drain of the first transistor is connected to the first driving module of the first pixel sub-circuit and the second driving module of the second pixel sub-circuit.

In this way, the data voltage writing module comprises the first transistor, and the first transistor functions as a switching device of the data voltage writing module in the pixel circuit and is easy to be implemented in the circuit design.

Optionally, data voltages written by the data voltage writing module comprise a first data voltage and a second data voltage, wherein the first data voltage is configured to drive the second threshold compensation module to perform threshold voltage compensation on the second driving module, and the second data voltage is configured to drive the first threshold compensation module to perform threshold voltage compensation on the first driving module.

In this way, since the data signal is a timing signal of a stepped shape, it is possible to realize two different voltage values inputted by one data signal line.

Optionally, each of the first light-emitting diode and the second light-emitting diode is an organic light emitting diode.

In this way, the organic light-emitting diode is used as the light-emitting diode of the first light emission module and the second light emission module in the pixel circuit, and it is easy to be implemented in the circuit design.

Optionally, all the transistors are thin film transistors of P type.

In this way, the thin film transistors of P type are used as the thin film transistors in the pixel circuit, which is easy to be implemented in the circuit design.

A display provided by an embodiment of the present disclosure comprises a plurality of pixels, data signal lines and gate control signal lines, wherein each two of the pixels constitute a pixel unit, and the display further comprises the pixel circuit described above which is connected to respective one of pixel units.

In this way, since the display comprises the pixel circuit described above which is connected to respective one of pixel units, the display possesses the advantage of the pixel circuit, and the display quality of the picture can be greatly improved.

Optionally, two pixels in each of the pixel units share one data signal line.

In this way, two pixels in each of the pixel units share one data signal line, thus one data signal line can be saved by the two pixels, and the arrangement of the data signal lines is simple.

Optionally, two pixels in each of the pixel units share one gate control signal line.

In this way, two pixels in each of the pixel units share one gate control signal line, thus one gate control signal line can be saved by the two pixels, and the arrangement of the gate control signal lines is simple.

DETAILED DESCRIPTION

Embodiments of the present disclosure provide a pixel circuit and a display for reducing size of a pixel circuit, so as to further reduce a pixel pitch, increase the number of the pixels contained in per unit area and improve picture display quality.

Here, the pixel circuit provided by embodiments of the present disclosure refers to an active matrix light emitting diode pixel circuit, and since the active matrix light emitting diode pixel circuit can play a role of performing compensation on a driving module of the pixel, the active matrix light emitting diode pixel circuit of the embodiments of the present disclosure can also be referred to as active matrix light emitting diode pixel compensation circuit.

Hereinafter, detailed discussion will be given to a technical solution provided by the embodiments of the present disclosure.

Figure 1:
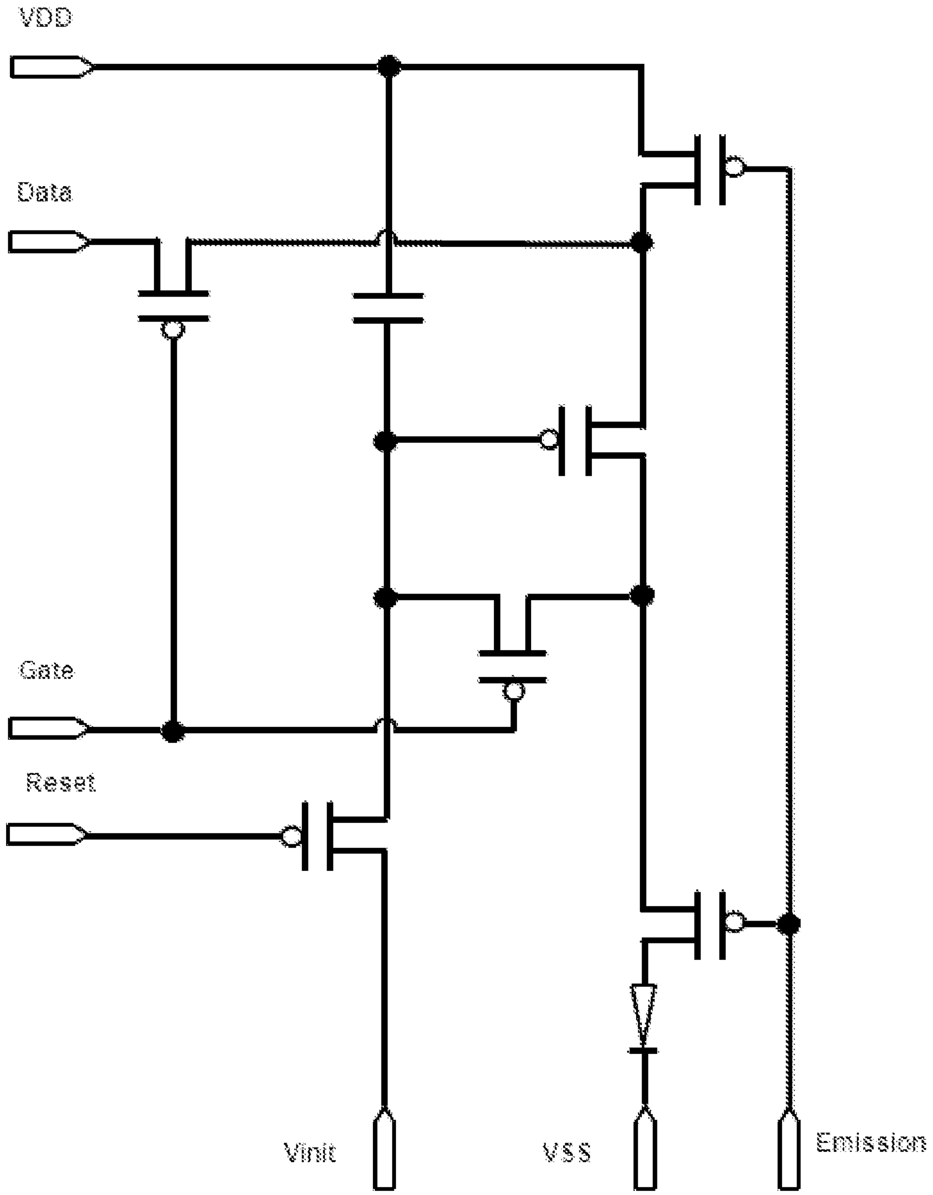
Prior Art Fig. 1
FIG. 1 is a schematic diagram of a 6T1C AMOLED pixel compensation circuit of a single pixel as known.
Figure 2:
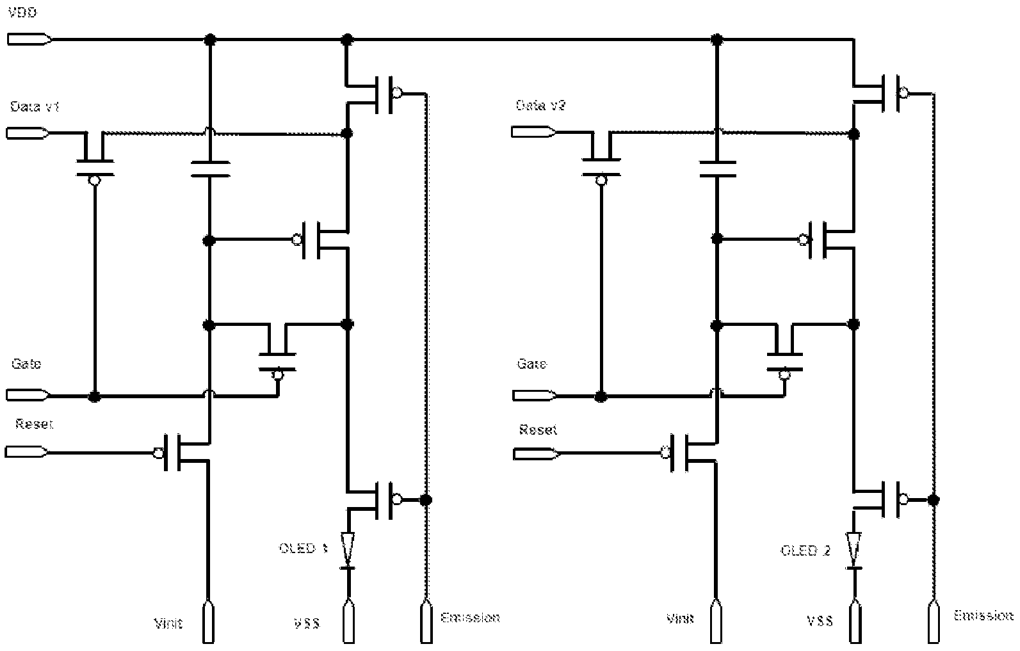
Prior Art Fig. 2
FIG. 2 is a schematic diagram of a 12T2C AMOLED pixel compensation circuit of two pixel as known.
Figure 3:
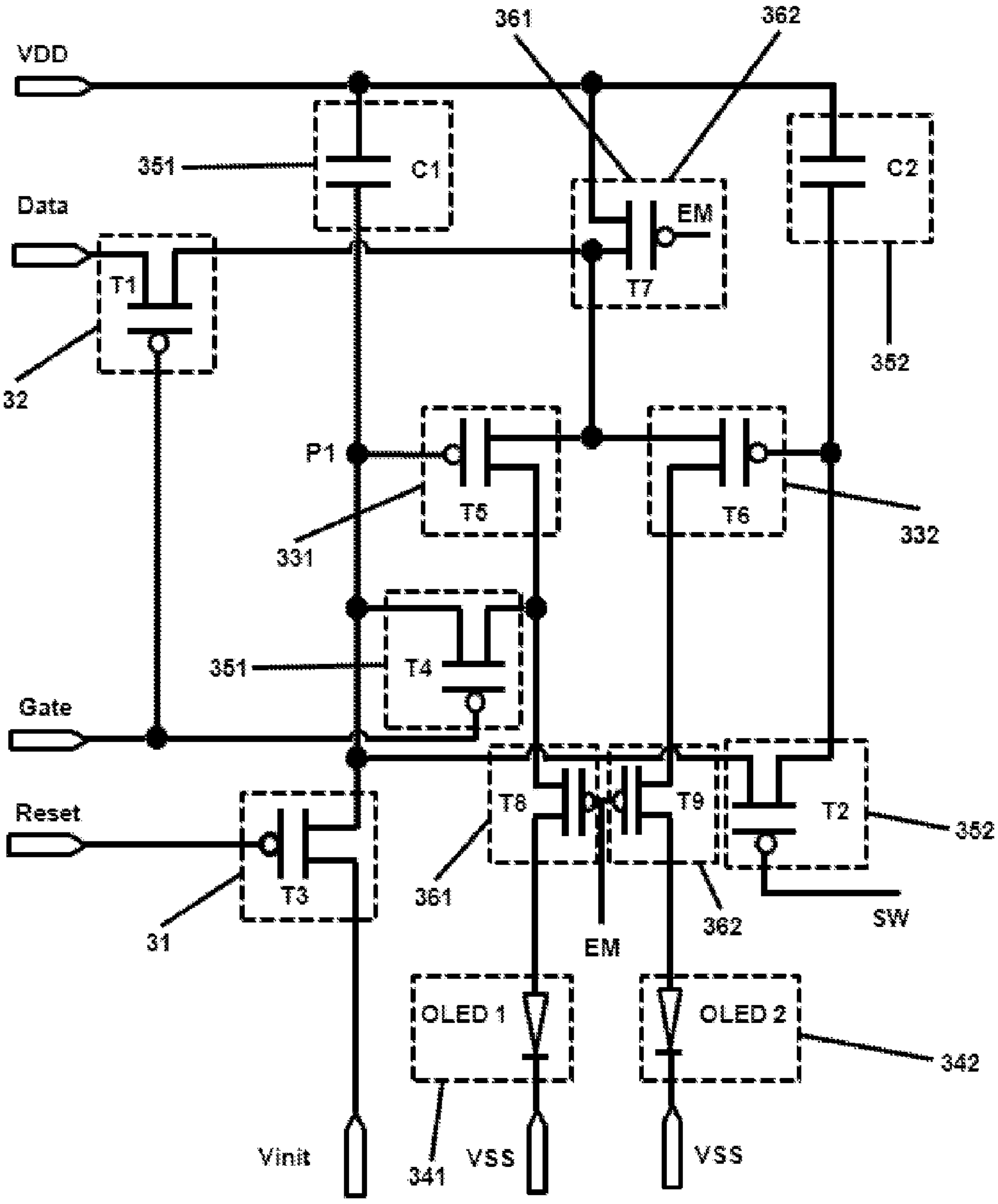
FIG. 3 is a schematic diagram of a 9T2C AMOLED pixel circuit provided by an embodiment of the present disclosure.

As shown in FIG. 3, an active matrix light emitting diode pixel compensation circuit provided in an embodiment of the disclosure comprises a first pixel sub-circuit and a second pixel sub-circuit, as well as an initialization module 31 and a data voltage writing module 32 connected to the first pixel sub-circuit and the second pixel sub-circuit.

The initialization module 31 is connected to a reset signal terminal (corresponding to an initial control signal Reset of the AMOLED pixel compensation circuit) and a low potential terminal (corresponding to an initialization voltage level signal Vinit of the AMOLED pixel compensation circuit), and serves to initialize the first pixel sub-circuit and the second pixel sub-circuit under a control of a reset signal inputted from the reset signal terminal.

The data voltage writing module 32 is connected to a data voltage terminal (corresponding to a data signal Data of the AMOLED pixel circuit) and a gate signal terminal (corresponding to a gate control signal Gate of the AMOLED pixel circuit), and serves to firstly write a first data voltage to the first pixel sub-circuit and the second pixel sub-circuit under a control of a signal inputted from the gate signal terminal and compensate for a driving module of the second pixel sub-circuit, and then to write a second data voltage to the first pixel sub-circuit and compensate for a driving module of the first pixel sub-circuit.

In the circuit shown in FIG. 3, in order to distinguish cross connection and disconnection between wires, the connected cross point is represented with a solid dot, and the disconnected cross point is represented with a hollow dot.

Optionally, the first pixel sub-circuit comprises a first driving module 331, a first light emission module 341, a first threshold compensation module 351 and a first light emission control module 361.

The initialization module 31 is connected to the first threshold compensation module 351 and initializes the first threshold compensation module 351 by an initialization signal outputted from the initialization module 31;

the first threshold compensation module 351 is connected to the first driving module 331, and serves to perform threshold voltage compensation on the first driving module 331;

the first light emission module 341 is connected to the first driving module 331 and the first light emission control module 361, and serves to emit light for displaying on effects of the first light emission control module 361.

Optionally, the first threshold compensation module 351 comprises a first storage capacitor C1, a fourth transistor T4; the first driving module 331 comprises a fifth transistor T5; the first light emission control module 361 comprises a seventh transistor T7 and an eighth transistor T8; and the first light emission module 341 comprises a first light-emitting diode OLED1.

Optionally, one terminal of the first storage capacitor C1 is connected to a high voltage level signal line (corresponding to a high voltage level signal VDD), and the other terminal thereof is connected to the source of the fourth transistor T4;

a gate of the fourth transistor T4 is connected to a gate signal terminal (corresponding to the gate control signal Gate of the AMOLED pixel circuit), and a drain of the fourth transistor T4 is connected to a drain of the fifth transistor T5;

a gate of the fifth transistor T5 is connected to the initialization module 31, and a source of the fifth transistor T5 is connected to the data voltage writing module 32;

a gate of the seventh transistor T7 is connected to the light emission control signal line (corresponding to the light emission control signal EM of the AMOLED pixel circuit), a source of the seventh transistor T7 is connected to the high voltage level signal line (corresponding to the high voltage level signal VDD), a drain of the seventh transistor T7 is connected to the source of the fifth transistor T5;

a gate of the eighth transistor T8 is connected to the light emission control signal line (corresponding to the light emission control signal EM of the AMOLED pixel circuit), a source of the eighth transistor T8 is connected to the drain of the fifth transistor T5, and a drain of the eight transistor T8 is connected to the first light-emitting diode OLED1;

an anode of the first light-emitting diode OLED1 is connected to the drain of the eighth transistor T8, and a cathode of the first light-emitting diode OLED1 is connected to the low voltage level signal line (corresponding to a low voltage level signal VSS).

Optionally, the second pixel sub-circuit comprises a second driving module 332, a second light emission module 342, a second threshold compensation module 352 and a second light emission control module 362;

the initialization module 31 is connected to the second threshold compensation module 352 and initializes the second threshold compensation module 352 by an initialization signal outputted from the initialization module 31;

the second threshold compensation module 352 is connected to the second driving module 332, and serves to perform threshold voltage compensation on the second driving module 332; and the second light emission module 342 is connected to the second light emission control module 362, and serves to emit light for displaying on effects of the second light emission control module 362.

Optionally, the second threshold compensation module 352 comprises a second storage capacitor C2 and a second transistor T2; the second driving module 332 comprises a sixth transistor T6; the second light emission control module 362 comprises a seventh transistor T7 and a ninth transistor T9; and the second light emission module 342 comprises a second light-emitting diode OLED2.

Optionally, one terminal of the second storage capacitor C2 is connected to the high voltage level signal line (corresponding to the high voltage level signal VDD), and the other terminal thereof is connected to a source of the second transistor T2;

a gate of the second transistor T2 is connected to a switching control signal line (corresponding to a switching control signal SW of the AMOLED pixel circuit), and a drain of the second transistor T2 is connected to the initialization module 31;

a gate of the sixth transistor T6 is connected to a source of the second transistor T2, and a source of the sixth transistor T6 is connected to the data voltage writing module 32;

a gate of the seventh transistor T7 is connected to the light emission control signal line (corresponding to the light emission control signal EM of the AMOLED pixel circuit), and a source of the seventh transistor T7 is connected to the high voltage level signal line (corresponding to the high voltage level signal VDD), and a drain of the seventh transistor T7 is connected to the source of the sixth transistor T6;

a gate of the ninth transistor T9 is connected to the light emission control signal line (corresponding to the light emission control signal EM of the AMOLED pixel circuit), a source of the ninth transistor T9 is connected to a drain of the sixth transistor T6, a drain of the ninth transistor T9 is connected to the second light-emitting diode OLED2;

an anode of the second light-emitting diode OLED2 is connected to the drain of the ninth transistor T9, and a cathode of the second light-emitting diode OLED2 is connected to the low voltage level signal line (corresponding to the low voltage level signal VSS).

Here, the seventh transistor T7 is a switch transistor shared by the first light emission control module 361 and the second light emission control module 362, and the first light emission control module 361 and the second light emission control module 362 can control the light emission of the OLED1 and the OLED2 simultaneously or separately.

Optionally, the initialization module 31 comprises a third transistor T3, wherein a gate of the third transistor T3 is connected to a reset signal line (corresponding to the initialization control signal Reset of the AMOLED pixel circuit), a drain of the third transistor T3 is connected to a first threshold compensation module 351 of the first pixel sub-circuit and the second threshold compensation module 352 of the second pixel sub-circuit, and a source of the third transistor T3 is connected to the low potential terminal (corresponding to the initialization voltage level signal Vinit of the AMOLED pixel circuit).

Optionally, the data voltage writing module 32 comprises a first transistor T1, wherein the gate of the first transistor T1 is connected to the gate signal terminal (corresponding to the gate control signal Gate of the AMOLED pixel circuit), the source of the first transistor T1 is connected to a data signal line (corresponding to the data signal Data of the AMOLED pixel circuit), and the drain of the first transistor T1 is connected to the first driving module 331 of the first pixel sub-circuit and the second driving module 332 of the second pixel sub-circuit.

Optionally, data voltages written by the data voltage writing module 32 comprise a first data voltage and a second data voltage, wherein the first data voltage serves to drive the second threshold compensation module 352 to perform threshold voltage compensation on the second driving module 332, and the second data voltage serves to drive the first threshold compensation module 351 to perform threshold voltage compensation on the first driving module 331.

Optionally, each of the first light-emitting diode OLED1 and the second light-emitting diode OLED2 is an organic light emitting diode.

Optionally, each of the transistors T1, T2, T3, T4, T5, T6, T7, T8, T9, and T10 is a thin film transistor of P type.

Hereinafter, the operational principle of the AMOLED pixel compensation circuit provided by an embodiment of the present disclosure will be explained in details with reference to FIGS. 3-8.

Figure 4:
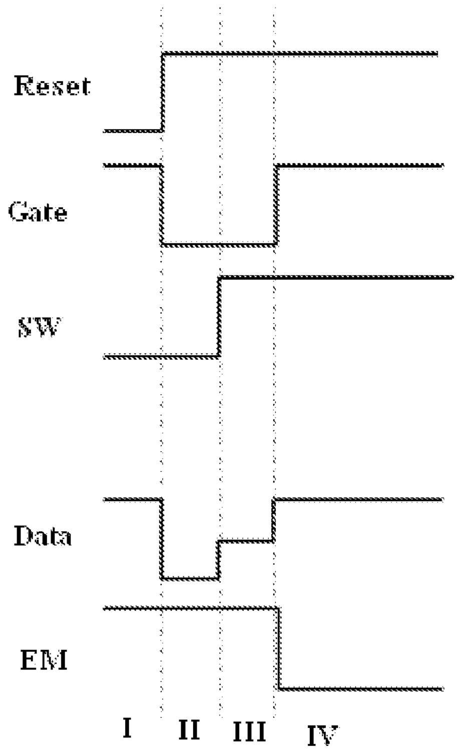
FIG. 4 is a timing chart of operation of the 9T2C AMOLED pixel circuit provided by the embodiment of the present disclosure.
Figure 5:
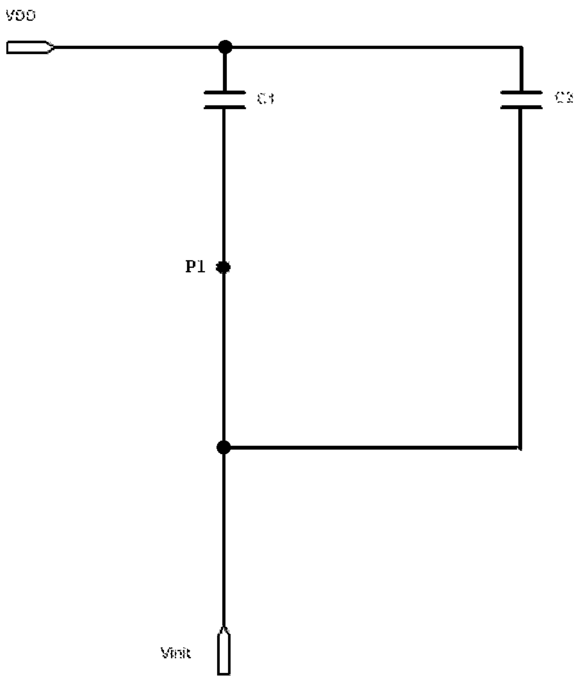
FIG. 5 is a simplified circuit diagram of the 9T2C AMOLED pixel circuit provided by the embodiment of the present disclosure in initialization operation phase.

As shown in FIG. 4, during a phase I, the gate control signal Gate and the light emission control signal EM are at a high level; the initialization control signal Reset and the switching control signal SW are at a low level; at this time, the third transistor T3 and the second transistor T2 in FIG. 3 are turned on; the first transistor T1, the fourth transistor T4, the seventh transistor T7, the eighth transistor T8 and the ninth transistor T9 are turned off; therefore, the simplified circuit diagram of FIG. 3 is shown in FIG. 5. Since storage capacitors C1 and C2 store the data signal Data inputted from a previous frame picture respectively, both of the two capacitors are connected to the initialization voltage level signal Vinit with a low potential, and each of the storage capacitors C1 and C2 discharges the initialization voltage level signal Vinit so that it is discharged to the initialization voltage Vinit.

Figure 6:
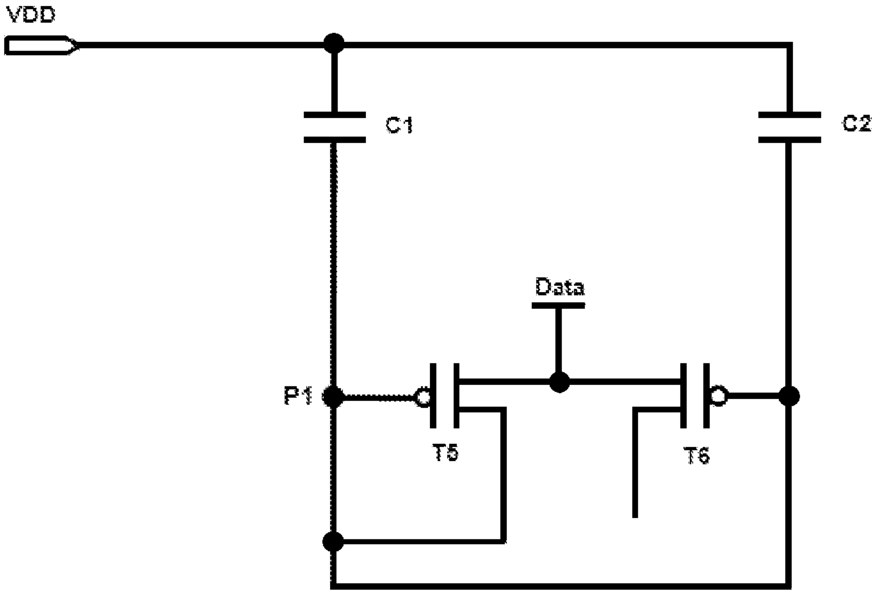
FIG. 6 is a simplified circuit diagram of the 9T2C AMOLED pixel circuit provided by the embodiment of the present disclosure in a first threshold compensation phase.

As shown in FIG. 4, during a phase 11, the initialization control signal Reset and the light emission control signal EM are at the high level; the gate control signal Gate and the switching control signal SW are at the low level; at this timing, the first transistor T1, the second transistor T2, the fourth transistor T4 in FIG. 3 are turned on; the third transistor T3, the seventh transistor T7, the eighth transistor T8 and the ninth transistor T9 are turned off; therefore, the simplified circuit diagram of FIG. 3 is shown in FIG. 6. The data level signal Data has a first voltage value V1, and at this time, the fifth transistor T5 is equivalent to a diode and the voltage of a first node P1 becomes a value of V=V1−Vth(T5), where Vth(T5) is the threshold voltage of the fifth transistor T5, and the voltage value V is stored in the storage capacitor C1 and the storage capacitor C2, and the two capacitors C1 and C2 are charged simultaneously. During a design, parameters for the fifth transistor T5 and the sixth transistor T6 are identical and these two transistors are located closely, accordingly the Vth(T5) may be considered as be equal to a Vth(T6) approximately, namely Vth(T5)=Vth(T6), wherein the Vth(T6) is a threshold voltage of the sixth transistor T6, so that the voltage value V=V1−Vth(T6) and the voltage value V is also stored in the storage capacitor C2.

Figure 7:
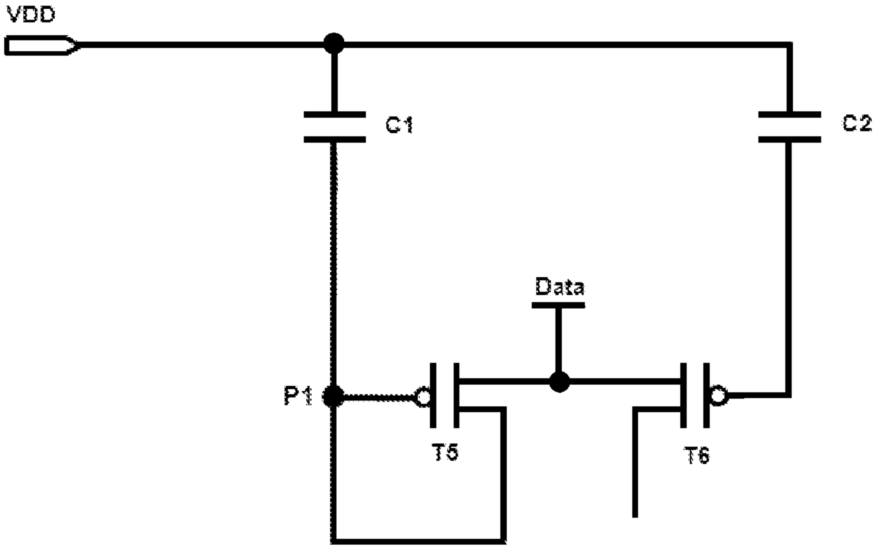
FIG. 7 is a simplified circuit diagram of the 9T2C AMOLED pixel circuit provided by the embodiment of the present disclosure in a second threshold compensation phase.

As shown in FIG. 4, during a phase Ill, the initialization control signal Reset, the switching control signal SW and the light emission control signal EM are at a high level; the gate control signal Gate is at the low level; at this timing, the first transistor T1 and the fourth transistor T4 in FIG. 3 are turned on; the second transistor T2, the third transistor T3, the seventh transistor T7, the eighth transistor T8 and the ninth transistor T9 are turned off; therefore, the simplified circuit diagram of FIG. 3 is shown in FIG. 7. The data level signal Data has the second voltage value V2, and at this time, the fifth transistor T5 is equivalent to a diode and the voltage of the first node P1 becomes of a value of V'=V2−Vth(T5), where Vth(T5) is a threshold voltage of the fifth transistor T5, and the voltage value V' is stored in the storage capacitor C1, and at this time the voltage value V=V1−Vth(T6) is stored in the C2.

Figure 8:
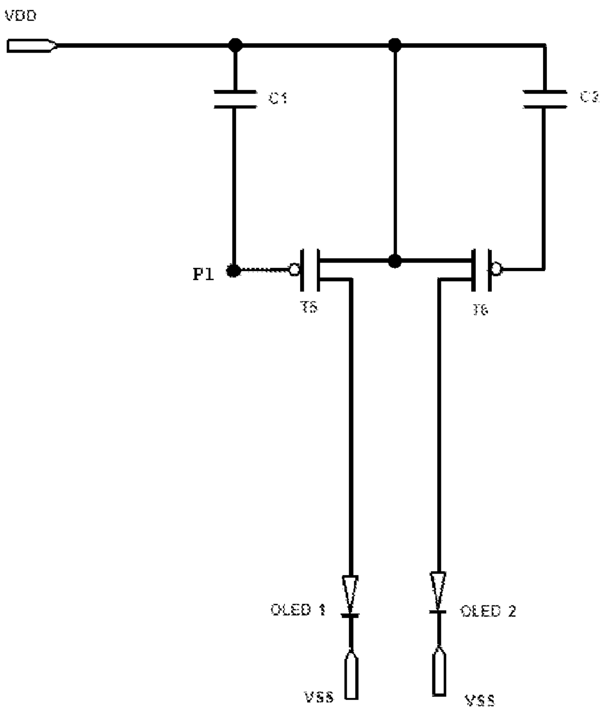
FIG. 8 is a simplified circuit diagram of the 9T2C AMOLED pixel circuit provided by the embodiment of the present disclosure in a light emission phase.

As shown in FIG. 4, in a phase IV which is a light emission phase, the initialization control signal Reset, the gate control signal Gate and the switching control signal SW are at the high level; the light emission control signal EM is at the low level; at this timing, the seventh transistor T7, the eighth transistor T8 and the ninth transistor T9 in FIG. 3 are turned on; the first transistor T1, the second transistor T2, the third transistor T3, the fourth transistor T4 are turned off; therefore, the simplified circuit diagram of FIG. 3 is shown in FIG. 8. Each of the fifth transistor T5 and the sixth transistor T6 is a driving transistor of OLED, and controls the current in such a way that the sources of the fifth transistor T5 and the sixth transistor T6 are connected to the high voltage level signal VDD, wherein a voltage value of the high voltage level signal VDD is a constant value and a current flowing through the first light-emitting diode OLED is expressed by:

$$Id1 = \frac{k}{2} * [VDD - (V2 - Vth(T5)) - Vth(T5)]^2 = \frac{k}{2} * (VDD - V2)^2,$$

Where, k is a preset constant, the current flowing through the second light-emitting diode OLED2 is expressed by $$\begin{aligned} Id2 &= \frac{k}{2} * [VDD - (V1 - Vth(T5)) - Vth(T6)]^2 \\ &= \frac{k}{2} * [VDD - V1 + Vth(T5) - Vth(T6)\}^2 \end{aligned}$$

Herein, Vth(T6) is the threshold voltage of the sixth transistor T6. In a design, the parameters of the fifth transistor T5 and the sixth transistor 6 are identical, and the fifth transistor T5 and the sixth transistor T6 are arranged closely in location; thus, it is approximate that Vth(T5)=Vth(T6), so $$Id2 = \frac{k}{2} * (VDD - V1)^2.$$

As can be seen from the above equations, the current Id1 flowing through the first light-emitting diode OLED1 and the current Id2 flowing through the second light-emitting diode OLED2 are independent of the threshold voltage Vth(T5) of the fifth transistor T5 and threshold voltage Vth(T6) of the sixth transistor T6, and therefore the compensation effect can be achieved.

In summary, the AMOLED pixel circuit provided by the embodiments of the present disclosure comprises nine thin film transistors and two capacitors, that is, it is a 9T2C AMOLED pixel circuit.

An embodiment of the present disclosure provides a display comprises a plurality of pixels, data signal lines and gate control signal lines, wherein each two of the pixels constitute a pixel unit, and the display further comprises the 9T2C AMOLED pixel circuit provided by the embodiments of the present disclosure which is connected to respective one of pixel units.

Hereinafter, an arrangement of the pixel unit comprising two pixels will be described in details.

Figure 9:
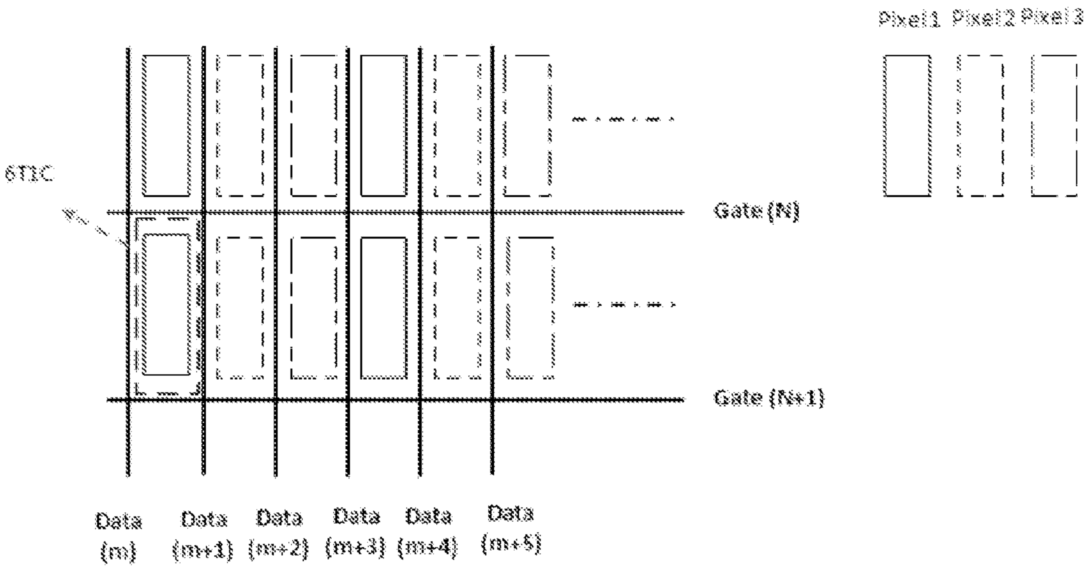
FIG. 9 is a schematic diagram of arrangement of a single pixel as known.

The pixel arrangement of a single pixel as known is shown in FIG. 9, and the compensation circuit in the single pixel is the 6T1C AMOLED pixel compensation circuit as known; if two pixels are placed together to form one pixel unit, the compensation circuit of the pixel unit as known is the 12T2C AMOLED pixel compensation circuit.

The arrangement of the pixel unit comprising two pixels provided by the embodiments of the present disclosure is shown in FIGS. 10-13, in which two pixels in any of the pixel units arranged in a horizon direction share one data signal line Data(m), and two pixels in any of the pixel units arranged in a vertical direction share one gate control signal line Gate (N), and in which two pixels in any of the pixel units arranged in the horizon direction are any two pixels in the horizon direction such as Pixel 1 and Pixel 2, or Pixel 2 and Pixel 3, and two pixels in the pixel unit arranged in the vertical direction are any two pixels in the vertical direction.

Figure 10:
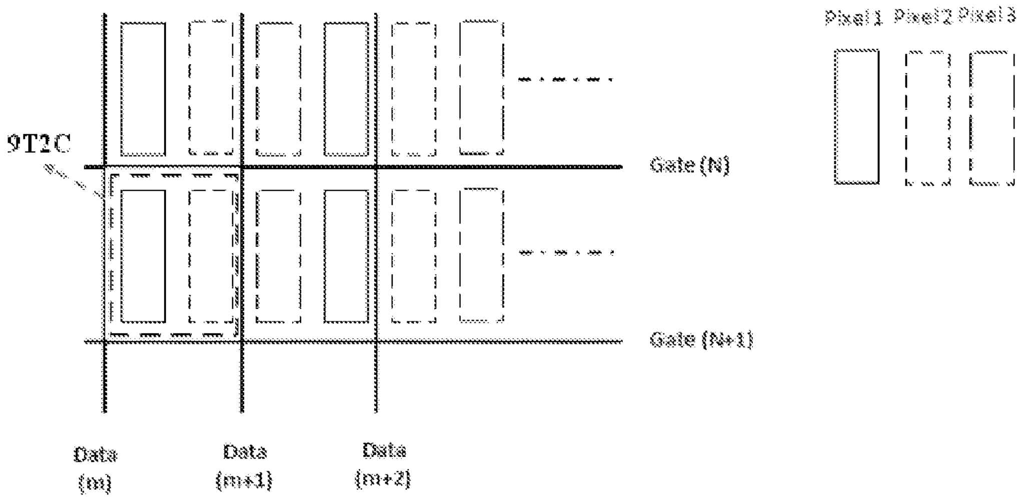
FIG. 10 is a schematic diagram of a horizontal arrangement of a pixel unit formed by any two pixels provided by an embodiment of the present disclosure.
Figure 11:
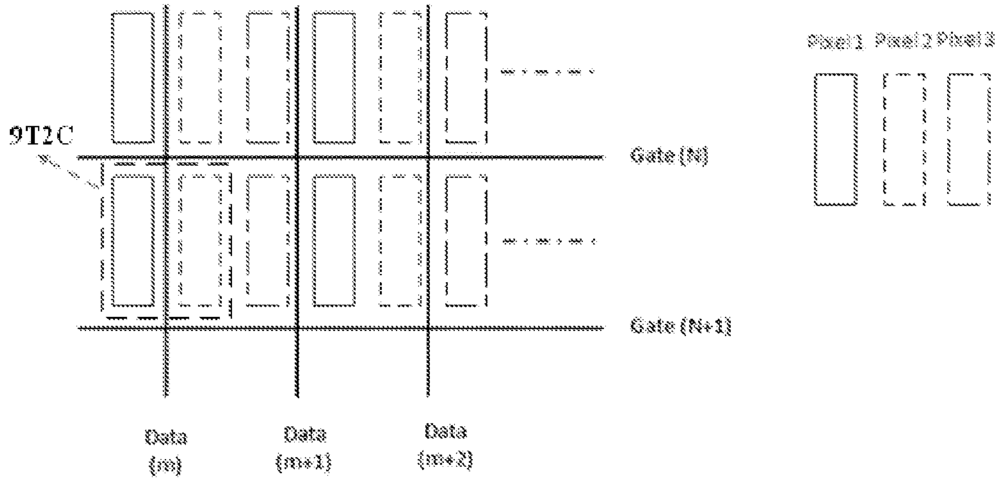
FIG. 11 is a schematic diagram of another horizontal arrangement of a pixel unit formed by any two pixels provided by an embodiment of the present disclosure.

As shown in FIGS. 10 and 11, two pixels in any of the pixel units arranged in the horizon direction share one data signal line Data (m), wherein the data signal line Data (m) is positioned between two pixels of the Pixel 1 and Pixel 2 arranged in the horizon direction, or the data signal line Data (m) is positioned on one side of the Pixel 1 of the two pixels Pixel 1 and Pixel 2 arranged in the horizon direction; of course, in the embodiments of the present disclosure, the data signal line Data (m) is not limited to be positioned on one side of the Pixel 1, and can be positioned on one side of any one of the two pixels arranged in the horizon direction.

Figure 12:
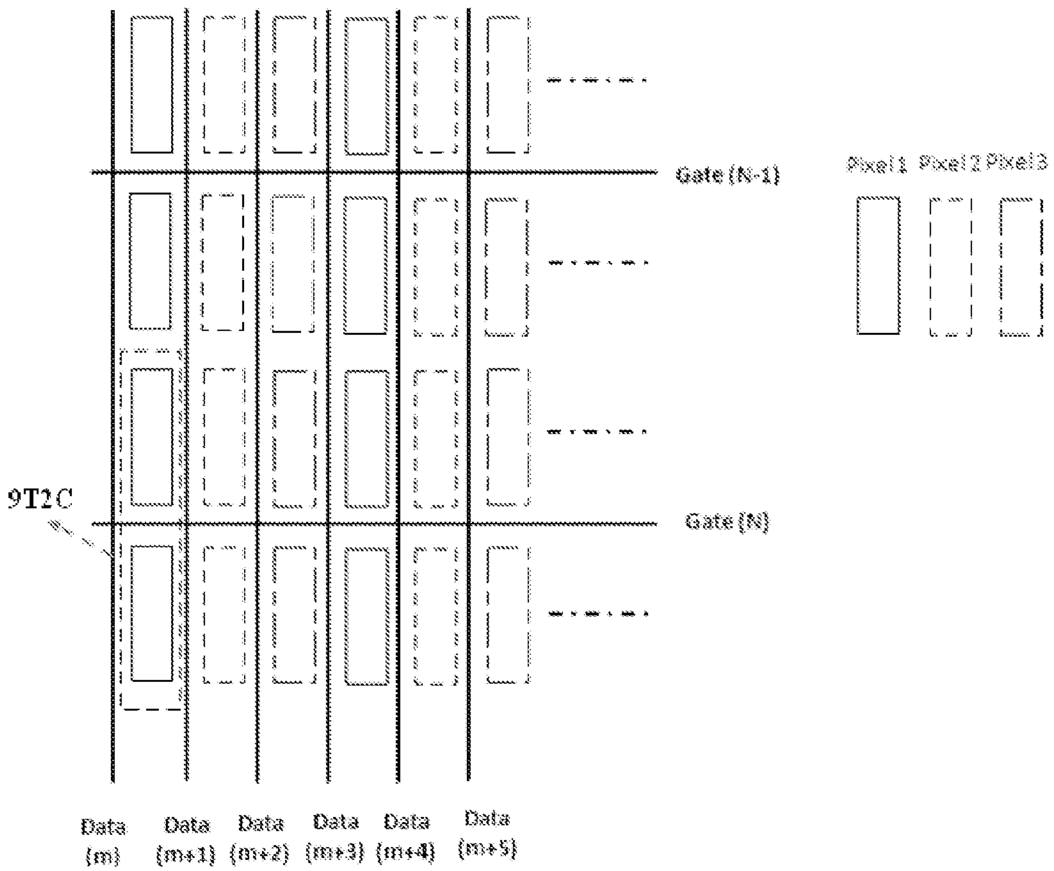
FIG. 12 is a schematic diagram of a vertical arrangement of a pixel unit formed by any two pixels provided by an embodiment of the present disclosure.
Figure 13:
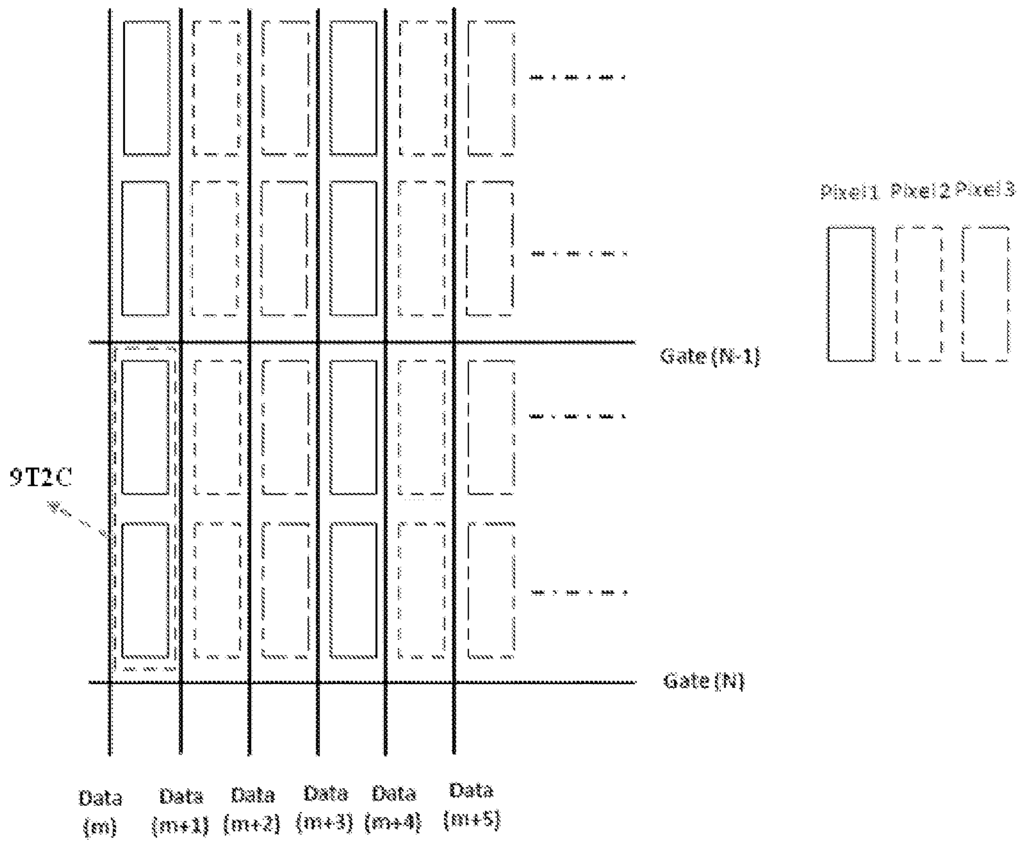
FIG. 13 is a schematic diagram of another vertical arrangement of a pixel unit formed by any two pixels provided by an embodiment of the present disclosure.

As shown in FIGS. 12 and 13, two pixels in any of the pixel units arranged in the vertical direction share one gate control signal line Gate (N), wherein the gate control signal line Gate (N) is positioned between any two of the pixels forming a pixel unit which are arranged in the vertical direction, or the gate control signal line Gate (N) is positioned on one side of any one of the any two pixels forming the pixel unit which are arranged in the vertical direction.

In summary, in the technical solution provided by the embodiments of the present disclosure, the AMOLED pixel circuit comprises a first pixel sub-circuit and a second pixel sub-circuit, as well as an initialization module and a data voltage writing module connected to the first pixel sub-circuit and the second pixel sub-circuit; the initialization module is connected to the reset signal terminal and the low potential terminal, and serves to initialize the first pixel sub-circuit and the second pixel sub-circuit under a control of a reset signal inputted from the reset signal terminal; the data voltage writing module is connected to a data voltage and a gate signal terminal, and serves to first write a first data voltage to the first pixel sub-circuit under a control of a signal inputted from the gate signal terminal, and then to write a second data voltage to the second pixel sub-circuit; the first pixel sub-circuit compensate for a driving module of the first pixel, and the second pixel sub-circuit compensate for a driving module of the second pixel; the AMOLED pixel circuit can reduce the size of pixel compensation circuit, so as to further reduce a pixel pitch, increase the number of pixels contained in per unit area and improve picture display quality.

Obviously, those skilled in the art can make various changes or variations to the embodiments of the present disclosure without departing from the spirit and scope of the present invention. In this way, as long as those modifications and variations to the embodiments of the present disclosure are within the scope of the claims of the present invention and the equivalence thereof, the present invention is also intended to cover these changes and variation.

What is claimed is:

1. A pixel circuit comprising:

a first pixel sub-circuit and a second pixel sub-circuit, as well as an initialization module and a data voltage writing module connected to the first pixel sub-circuit and the second pixel sub-circuit, wherein the initialization module is connected to a reset signal terminal and a low potential terminal, and is configured to initialize the first pixel sub-circuit and the second pixel sub-circuit under a control of a reset signal inputted from the reset signal terminal;

the data voltage writing module is connected to a data signal line and a gate signal terminal, and is configured to firstly write a first data voltage to the first pixel sub-circuit and the second pixel sub-circuit under a control of a signal inputted from the gate signal terminal and to compensate for a driving module of the second pixel sub-circuit, and then to write a second data voltage to the first pixel sub-circuit and compensate for a driving module of the first pixel sub-circuit;

wherein the first pixel sub-circuit comprises a first driving module and a first threshold compensation module, the first threshold compensation module is connected to the first driving module and is configured to perform threshold voltage compensation on the first driving module;

the first threshold compensation module comprises a first storage capacitor and a fourth transistor, and the first driving module comprises a fifth transistor, wherein one terminal of the first storage capacitor is connected to a high voltage level signal line, and the other terminal thereof is connected to a source of the fourth transistor; a gate of the fourth transistor is connected to a gate signal terminal, a drain of the fourth transistor is connected to a drain of the fifth transistor, and the source of the fourth transistor is connected to a gate of the fifth transistor; the gate of the fifth transistor is connected to the initialization module, and a source of the fifth transistor is connected to the data voltage writing module;

the second pixel sub-circuit comprises a second driving module and a second threshold compensation module; the second threshold compensation module is connected to the second driving module, and is configured to perform threshold voltage compensation on the second driving module;

wherein the second threshold compensation module comprises a second storage capacitor and a second transistor, and the second driving module comprises a sixth transistor; one terminal of the second storage capacitor is connected to the high voltage level signal line, and the other terminal thereof is connected to a source of the second transistor; a gate of the second transistor is connected to a switching control signal line, and a drain of the second transistor is connected to the initialization module; a gate of the sixth transistor is connected to the source of the second transistor, and a source of the sixth transistor is connected to the data voltage writing module.

2. The pixel circuit according to claim 1, wherein the first pixel sub-circuit further comprises a first light emission module and a first light emission control module, wherein the initialization module is connected to the first threshold compensation module and is configured to initialize the first threshold compensation module by an initialization signal outputted from the initialization module; and the first light emission module is connected to the first light emission control module, and is configured to emit light for displaying under a control of the first light emission control module.

3. The pixel circuit according to claim 2, wherein the first light emission control module comprises a seventh transistor and an eighth transistor; and the first light emission module comprises a first light-emitting diode.

4. The pixel circuit according to claim 3, wherein a gate of the seventh transistor is connected to the light emission control signal line, a source of the seventh transistor is connected to the high voltage level signal line, a drain of the seventh transistor is connected to the source of the fifth transistor;

a gate of the eighth transistor is connected to the light emission control signal line, a source of the eighth transistor is connected to the drain of the fifth transistor, and a drain of the eighth transistor is connected to the first light-emitting diode; and an anode of the first light-emitting diode is connected to the drain of the eighth transistor, and a cathode of the first light-emitting diode is connected to the low voltage level signal line.

5. The pixel circuit according to claim 3, wherein both the first light-emitting diode and the second light-emitting diode are organic light emitting diodes.

6. The pixel circuit according to claim 3, wherein all the transistors are thin film transistors of P type.

7. The pixel circuit according to claim 1, wherein the initialization module is connected to the first threshold compensation module and is configured to initialize the first threshold compensation module by an initialization signal outputted from the initialization module;

wherein the first pixel sub-circuit further comprises a first light emission module and a first light emission control module, and the first light emission module is connected to the first light emission control module, and is configured to emit light for displaying under a control of the first light emission control module;

the second pixel sub-circuit further comprises a second light emission module, and a second light emission control module, the initialization module is connected to the second threshold compensation module and is configured to initialize the second threshold compensation module by an initialization signal outputted from the initialization module; and the second light emission module is connected to the second light emission control module, and is configured to emit light for displaying under a control of the second light emission control module.

8. The pixel circuit according to claim 7, wherein the second light emission control module comprises a seventh transistor and a ninth transistor; and the second light emission module comprises a second light-emitting diode.

9. The pixel circuit according to claim 8, wherein a gate of the seventh transistor is connected to the light emission control signal line, a source of the seventh transistor is connected to the high voltage level signal line, and a drain of the seventh transistor is connected to the source of the sixth transistor;

a gate of the ninth transistor is connected to the light emission control signal line, a source of the ninth transistor is connected to a drain of the sixth transistor, a drain of the ninth transistor is connected to the second light-emitting diode; and an anode of the second light-emitting diode is connected to the drain of the ninth transistor, and a cathode of the second light-emitting diode is connected to the low voltage level signal line.

10. The pixel circuit according to claim 7, wherein the initialization module comprises a third transistor, wherein a gate of the third transistor is connected to a reset signal line, a drain of the third transistor is connected to the first threshold compensation module of the first pixel sub-circuit and the second threshold compensation module of the second pixel sub-circuit, and a source of the third transistor is connected to the low potential terminal.

11. The pixel circuit according to claim 7, wherein the data voltage writing module comprises a first transistor, wherein a gate of the first transistor is connected to the gate signal terminal, a source of the first transistor is connected to a data signal line, and a drain of the first transistor is connected to the first driving module of the first pixel sub-circuit and the second driving module of the second pixel sub-circuit.

12. The pixel circuit according to claim 7, wherein data voltages written by the data voltage writing module comprise a first data voltage and a second data voltage, wherein the first data voltage is configured to drive the second threshold compensation module to perform threshold voltage compensation on the second driving module, and the second data voltage is configured to drive the first threshold compensation module to perform threshold voltage compensation on the first driving module.

13. The pixel circuit according to claim 7, wherein the first light emission control module comprises a seventh transistor and an eighth transistor; and the first light emission module comprises a first light-emitting diode.

14. A display comprising a plurality of pixels, data signal lines and gate control signal lines, wherein each two of the pixels constitute a pixel unit, and the display further comprises the pixel circuit according to claim 1 which is connected to respective one of pixel units.

15. The display according to claim 14, wherein the two pixels in each of pixel units share one data signal line.

16. The display according to claim 14, wherein the two pixels in each of pixel units share one gate control signal line.

17. The display according to claim 14, wherein the first pixel sub-circuit further comprises a first light emission module and a first light emission control module, the initialization module is connected to the first threshold compensation module and is configured to initialize the first threshold compensation module by an initialization signal outputted from the initialization module; and the first light emission module is connected to the first light emission control module, and is configured to emit light for displaying under a control of the first light emission control module.

18. The display according to claim 17, wherein the first light emission control module comprises a seventh transistor and an eighth transistor; and the first light emission module comprises a first light-emitting diode.

19. The display according to claim 18, wherein a gate of the seventh transistor is connected to the light emission control signal line, a source of the seventh transistor is connected to the high voltage level signal line, a drain of the seventh transistor is connected to the source of the fifth transistor;

a gate of the eighth transistor is connected to the light emission control signal line, a source of the eighth transistor is connected to the drain of the fifth transistor, and a drain of the eighth transistor is connected to the first light-emitting diode; and an anode of the first light-emitting diode is connected to the drain of the eighth transistor, and a cathode of the first light-emitting diode is connected to the low voltage level signal line.

20. The display according to claim 14, wherein the second pixel sub-circuit further comprises a second light emission module, and a second light emission control module, the initialization module is connected to the second threshold compensation module and is configured to initialize the second threshold compensation module by an initialization signal outputted from the initialization module;

and the second light emission module is connected to the second light emission control module, and is configured to emit light for displaying under a control of the second light emission control module.

* * * * *